United States Patent [19]
Hinton

[11] Patent Number: 5,148,768
[45] Date of Patent: Sep. 22, 1992

[54] PET HOUSE APPARATUS

[76] Inventor: Michele D. Hinton, Rt. 5 Intervale, Covington, Va. 24426

[21] Appl. No.: 779,320

[22] Filed: Oct. 18, 1991

[51] Int. Cl.$^5$ ............................................. A01K 31/00
[52] U.S. Cl. ......................................... 119/19; 119/15
[58] Field of Search ................... 119/15, 17, 19, 29.5, 119/51.5, 53.5, 54, 56.1, 75

[56] References Cited

U.S. PATENT DOCUMENTS

| | | | |
|---|---|---|---|
| 598,563 | 2/1898 | Ferris | 119/53.5 |
| 2,659,345 | 11/1953 | Herbert | 119/19 |
| 3,086,498 | 4/1963 | Reynolds et al. | 119/17 |
| 3,100,474 | 8/1963 | Schneider | 119/17 |
| 3,515,099 | 6/1970 | Clark et al. | 119/75 |
| 3,557,756 | 1/1971 | Ramsey | 119/19 |
| 3,802,395 | 4/1974 | von Taschitzki | 119/75 |
| 3,962,993 | 6/1976 | Dattilo | 119/19 |
| 4,177,761 | 12/1979 | Bellocchi, Jr. | 119/29 X |

FOREIGN PATENT DOCUMENTS

| | | | |
|---|---|---|---|
| 2711222 | 9/1978 | Fed. Rep. of Germany | 119/19 |
| 3508537 | 9/1986 | Fed. Rep. of Germany | 119/75 |
| 2584567 | 1/1987 | France | 119/19 |
| 2631211 | 11/1989 | France | 119/19 |
| 1060653 | 7/1959 | Netherlands | 119/53.5 |
| 158408 | 11/1919 | United Kingdom | 119/17 |

*Primary Examiner*—John G. Weiss
*Assistant Examiner*—Nicholas D. Lucchesi
*Attorney, Agent, or Firm*—Leon Gilden

[57] ABSTRACT

A pet house construction includes a front entrance, with a plurality of drawer-like containers mounted between an upper and lower floor of the house structure. The house floor may be further removable to permit access of the pet to the drawer structure permitting filling of the drawer structure with various components, such as blankets, kitty litter, and the like. Further construction of the house may include ventilation apparatus to direct ventilation through the house, as well as water and dry food dispensing containers to provide ease of orientation of the various feeding components of an associated pet.

1 Claim, 4 Drawing Sheets

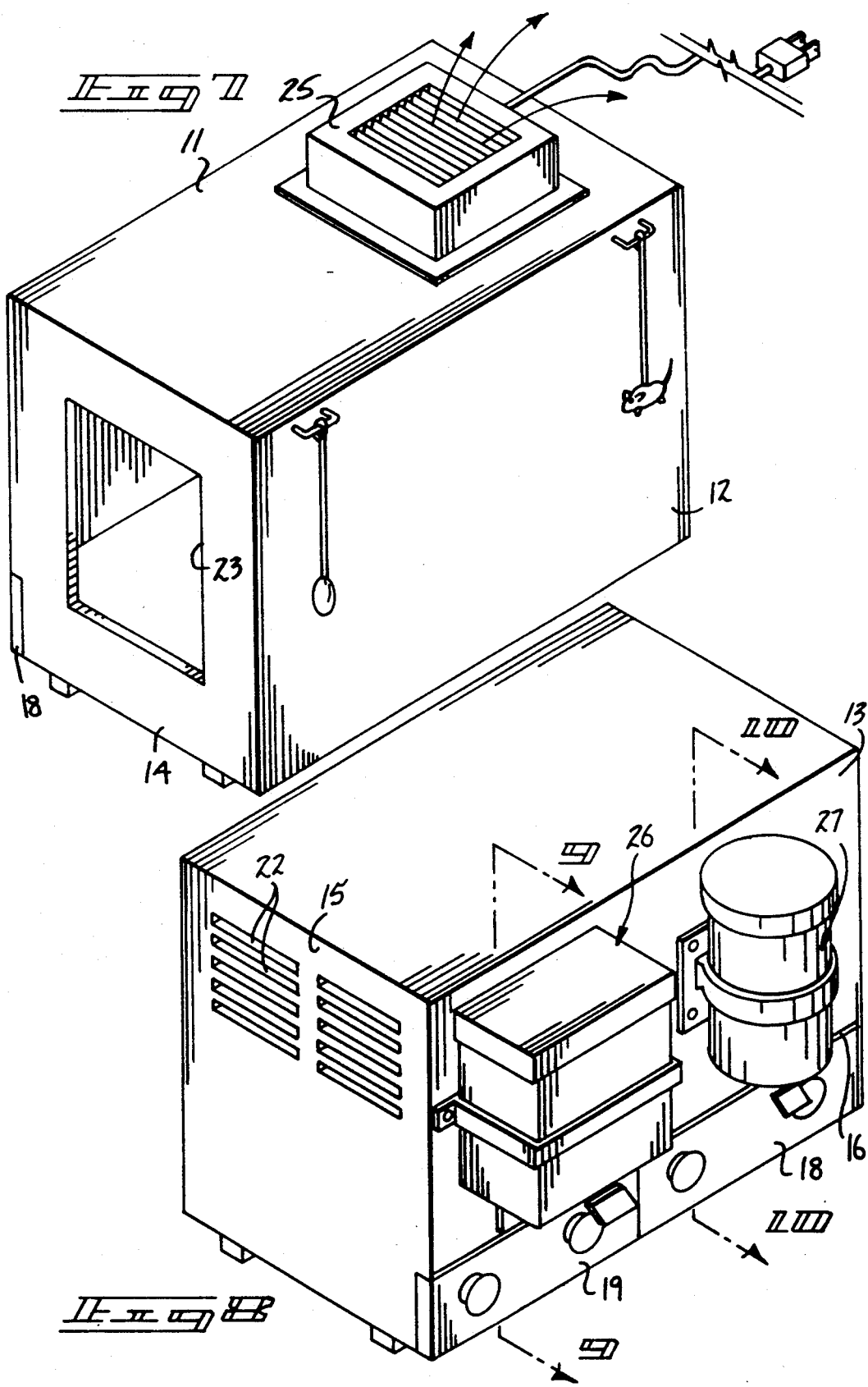

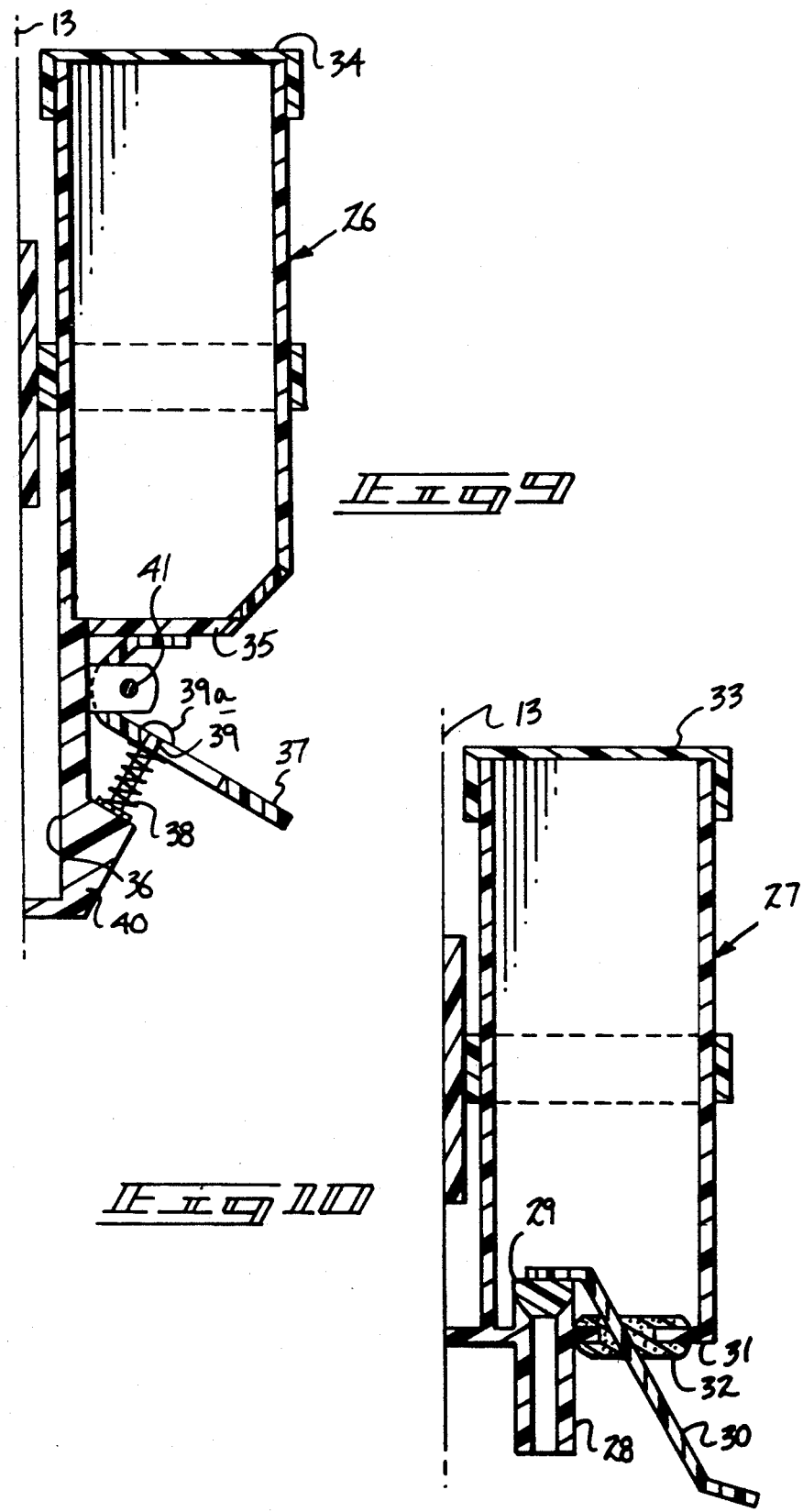

PET HOUSE APPARATUS

BACKGROUND OF THE INVENTION

1. Field of the Invention

The field of invention relates to pet houses, and more particularly pertains to a new and improved pet house apparatus wherein the same is arranged to provide for the care and containment of a pet such as a cat.

2. Description of the Prior Art

Pet houses of various types have been utilized in the prior art. Specifically, in the care and maintenance of cats, these animals require various components unique to the species. The prior art formed with houses of various types is exemplified in U.S. Pat. No. 4,347,807 to Reich wherein a cat housing includes a plurality of stacked cavities for receiving a cat therewithin.

U.S. Pat. No. 4,576,116 to Binkert sets forth a collapsible house formed as a tent-like structure for the containment of a cat therewithin.

As such, it may be appreciated that there continues to be a need for a new and improved pet house apparatus as set forth by the instant invention which addresses both the problems of ease of use as well as effectiveness in construction in providing an organization for a unique and convenient care and feeding of a cat and in this respect, the present invention substantially fulfills this need.

SUMMARY OF THE INVENTION

In view of the foregoing disadvantages inherent in the known types of pet house apparatus now present in the prior art, the present invention provides a pet house apparatus wherein the same is arranged to provide for storage and positioning of various entertainment devices for the maintenance of a cat. As such, the general purpose of the present invention, which will be described subsequently in greater detail, is to provide a new and improved pet house apparatus which has all the advantages of the prior art pet house apparatus and none of the disadvantages.

To attain this, the present invention provides a pet housing construction including a front entrance, with a plurality of drawer-like containers mounted between an upper and lower floor of the house structure. The house floor may be further removable to permit access of the pet to the drawer structure permitting filling of the drawer structure with various components, such as blankets, kitty litter, and the like. Further construction of the house may include ventilation apparatus to direct ventilation through the house, as well as water and dry food dispensing containers to provide ease of orientation of the various feeding components of an associated pet.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pet house apparatus which has all the advantages of the prior art pet house apparatus and none of the disadvantages.

It is another object of the present invention to provide a new and improved pet house apparatus which may be easily and efficiently manufactured and marketed.

It is a further object of the present invention to provide a new and improved pet house apparatus which is of a durable and reliable construction.

An even further object of the present invention is to provide a new and improved pet house apparatus which is susceptible of a low cost of manufacture with regard to both materials and labor, and which accordingly is then susceptible of low prices of sale to the consuming public, thereby making such pet house apparatus economically available to the buying public.

Still yet another object of the present invention is to provide a new and improved pet house apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an isometric illustration of a modified top wall of the housing.

FIG. 8 is an isometric illustration of a modified side wall of the housing.

FIG. 9 is an orthographic view, taken along the lines 9—9 of FIG. 8 in the direction indicated by the arrows.

FIG. 10 is an orthographic view, taken along the lines 10—10 of FIG. 8 in the direction indicated by the arrows.

DESCRIPTION OF THE PREFERRED EMBODIMENT

Figure 1:
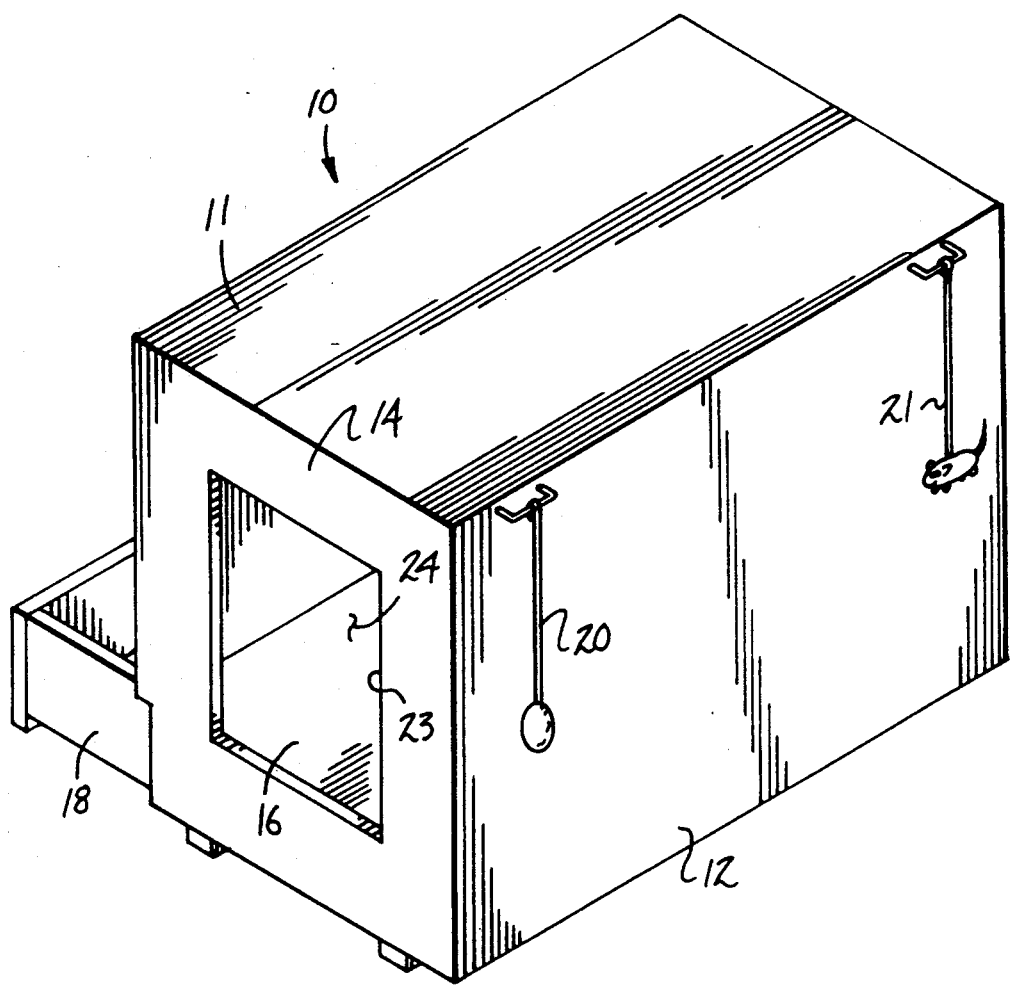
FIG. 1 is an isometric illustration of the instant invention.
Figure 2:
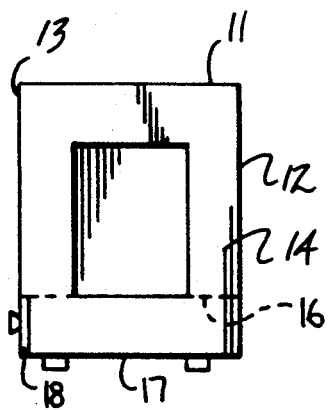
FIG. 2 is an orthographic front view of the instant invention.
Figure 3:
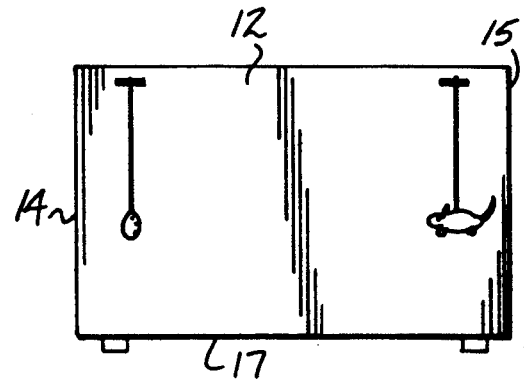
FIG. 3 is an orthographic side view of the instant invention.
Figure 4:
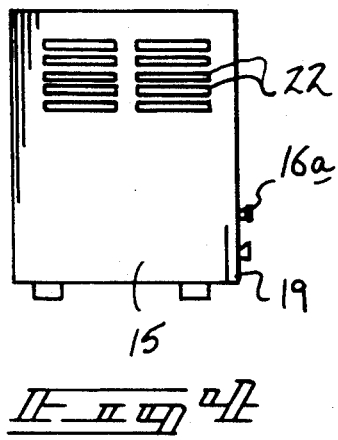
FIG. 4 is an orthographic rear view of the instant invention.
Figure 5:
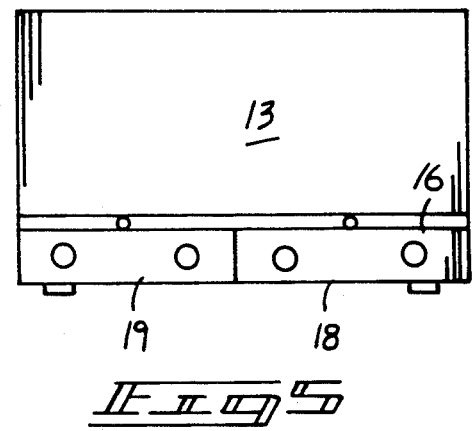
FIG. 5 is an orthographic side view of the instant invention illustrating a removable top floor.

With reference now to the drawings, and in particular to FIGS. 1 to 10 thereof, a new and improved pet house apparatus embodying the principles and concepts of the present invention and generally designated by the reference numeral 10 will be described.

More specifically, the pet house apparatus 10 of the instant invention essentially comprises an enclosure defined by a top wall 11, a first side wall 12, a second side wall 13 spaced from the first side wall 12, a rear wall 15 spaced from a front wall 14. The enclosure includes a top floor plate 16 spaced from and parallel a bottom floor plate 17. As illustrated in the FIGS. 1, 5, and 6 for example, the second side wall 13 includes a first and second slide container 18 and 19 arranged at adjacency relative to one another and directed slidably between the top and bottom floor plates 16 and 17 respectively. The containers are arranged to secure various components for the maintenance of a pet and specifically a cat, such as litter, food, blankets, toys, and the like. The slide containers are arranged to be formed with handles mounted to the forward face, wherein each forward face is coplanar with the second side wall 13. The first side wall includes a plurality of tether lines defined by a respective first and second tether line 20 and 21 each including a respective first and second resilient toy member at a lower terminal end thereof, wherein each tether line is suspended relative to its upper distal end for use in entertainment and amusement of a cat contained within the enclosure. At least one row of vent openings 22 is directed through the rear wall 15, as illustrated in the FIG. 6 for example, and if required in geographical areas of elevated temperatures, a fan housing 25 enclosing a fan and associated motor of conventional construction is mounted to the top wall 11 to cooperate with the rear wall 15 and the front wall 14 that includes a pet receiving entrance opening 23 to effect ventilation of the enclosure.

Figure 6:
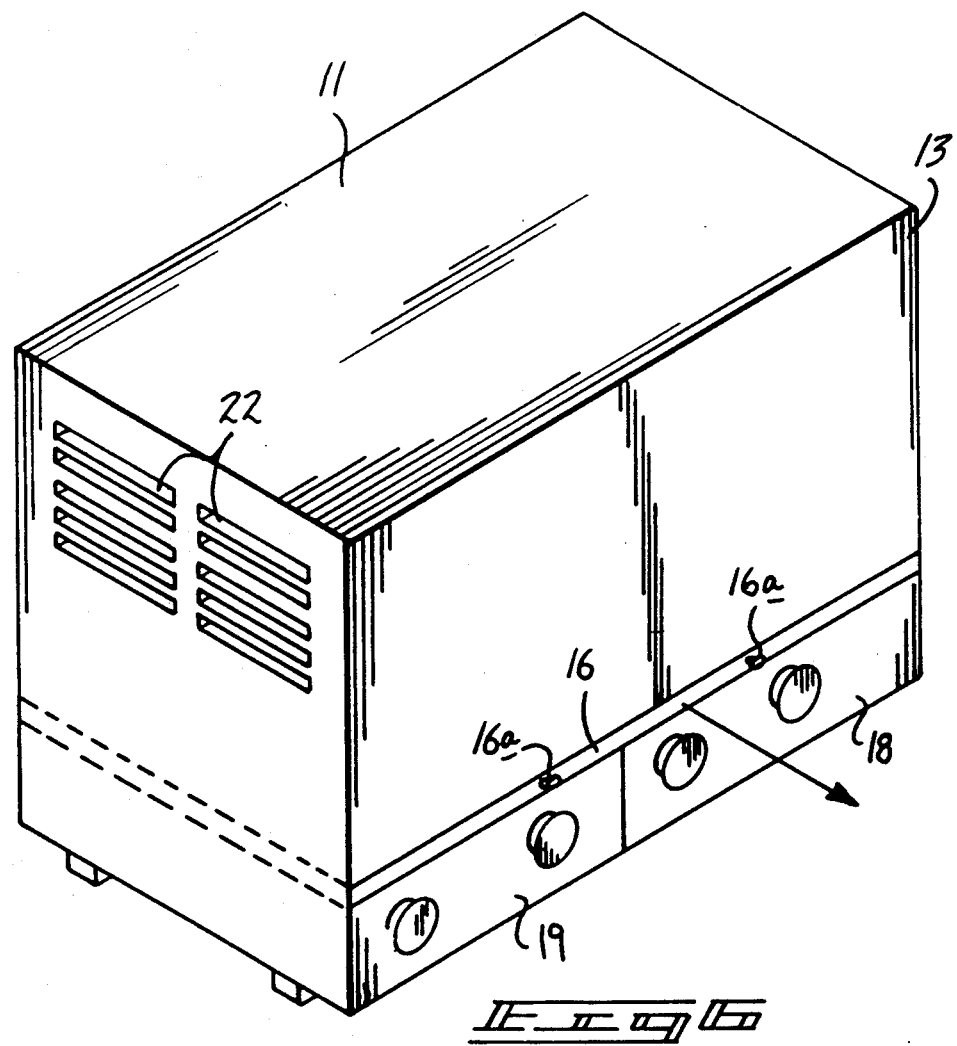
FIG. 6 is an isometric illustration of the instant invention illustrating the removable top floor structure.

As illustrated in the FIG. 6 for example, the top floor plate 16 is slidably contained within the enclosure to overlie the first and second slide containers 18 and 19 to permit removal of the top floor 16 if required to permit a pet to be availed of components within the slide containers, such as a blanket and the like, whereupon the top floor 16 is reinserted to segregate the slide containers from use by the pet.

As illustrated in the FIGS. 8-10, the second side wall 13 is arranged as required to include a respective feed and water housing 26 and 27 to include dry food and water and provide such components for ease of access to be utilized with underlying receiving containers (not shown) of conventional construction for conventional use in the feeding of a pet. The water reservoir housing 27 includes a reservoir housing bottom wall 31 mounting a conduit 28 therethrough. An upper terminal end of the conduit within the reservoir includes a conduit plug 29 sealingly mounted to an upper terminal end of the conduit, with a lever plate 30 having its upper distal end fixedly mounted to the plug 29 and the lever plate 30 directed through a bottom wall seal 32 to permit pivotment of the lever plate 30 with the lower distal end of the lever plate 30 positioned below the reservoir bottom wall 31 to permit its pivotment and lifting of the plug 29 and ultimate directing of water and fluid through the conduit 28 to an underlying container. A reservoir fill cap 33 is removably mounted relative to an upper terminal end of the reservoir to permit replenishment of fluid within the reservoir as required.

The feed housing 26 includes a feed housing fill cap 34 removably mounted to an upper terminal end thereof spaced above a feed housing bottom wall 35 removably mounted relative to the feed housing. A feed housing flange plate 36 extends below the feed housing and includes a flange plate boss 40 directed inwardly and upwardly of the plate positioned below the bottom wall 35. A rod 39 is fixedly mounted to the boss 40 that includes an enlarged rod head 39a to capture an actuator plate 37 between the rod head 39a and a spring 38 positioned between the actuator plate 37 and the boss 40. A pivot axle 41 mounted below and orthogonally oriented relative to the actuator plate 38 permits rotation of the actuator plate 38 about the axle 41 and the separation of the feed housing bottom wall 35 relative to the feed housing to permit directing of food from the reservoir into another associated container of conventional construction.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pet house apparatus, comprising in combination, an enclosure, the enclosure including a top wall, a first side wall spaced from a second side wall, a front wall spaced from a rear wall, and a top floor plate spaced from a bottom floor plate, the first side wall including at least one tether line, the at least one tether line mounted at an upper distal end of the at least one tether line to the first side wall and a lower distal end of the at least one tether line including at least one resilient toy member arranged for amusement of a pet, and the front wall including a pet receiving entrance opening directed into a pet receiving cavity within the enclosure, and the second side wall including a plurality of slide containers directed through the second side wall disposed between the top floor plate and the bottom floor plate, and each slide container including a slide container front wall, each slide container front wall coplanar with the second side wall when each slide container is positioned within the enclosure, and the rear wall includes a plurality of vent openings directed therethrough, and the top wall includes blower means fixedly mounted to the top wall to direct ventilation through the enclosure from the pet receiving entrance opening and the vent openings, and the top floor plate is slidably mounted relative to the enclosure and is arranged for removal relative to the enclosure for access of a pet to the plurality of slide container, and the second side wall includes a water reservoir housing and a feed housing fixedly mounted to the second side wall positioned above the top floor plate, and the water reservoir housing includes a reservoir housing bottom wall, and a conduit directed through the bottom wall in fluid communication interiorly of the reservoir housing, and a conduit plug mounted to an upper terminal end of the conduit within the reservoir housing, wherein the plug is fixedly secured to an upper distal end of a lever plate, and the lever plate is directed through the bottom wall, wherein a lower distal end of the lever plate is positioned below the bottom wall, and the bottom wall including a seal, the seal resiliently mounting the lever plate therethrough to bias the plug onto the upper terminal end of the conduit permitting manual deflection of the plug relative to the conduit upon rotation of the lever plate within the seal, and the feed housing includes a feed housing bottom wall, the feed housing bottom wall including a flange plate mounted to the feed housing directed below the feed housing bottom wall, and the flange plate including a flange plate boss projecting forwardly of the flange plate and positioned below the feed housing bottom wall, the flange plate boss including a rod member fixedly mounted to the flange plate boss, the rod member including an enlarged rod head mounted to an upper terminal end of the rod, and an actuator plate mounted pivotally to the rod below the rod head, and a spring captured between the actuator plate and the flange plate boss, wherein the spring is arranged in surrounding relationship relative to the rod, and the actuator plate is fixedly mounted to the feed housing bottom wall, and the feed housing bottom wall is removably mounted relative to the reservoir housing, and a pivot axle mounted to the reservoir housing orthogonally oriented relative to the actuator plate, whereupon rotation of the rod about the pivot axle effects displacement of the feed housing bottom wall relative to the feed housing.

* * * * *